(12) United States Patent
Zhou et al.

(10) Patent No.: US 8,935,260 B2
(45) Date of Patent: Jan. 13, 2015

(54) DOCUMENT KEY PHRASE EXTRACTION METHOD

(75) Inventors: Bao-Yao Zhou, Beijing (CN); Ping Luo, Beijing (CN); Sheng-Wen Yang, Beijing (CN); Yuhong Xiong, Mountain View, CA (US); Wei Liu, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 202 days.

(21) Appl. No.: 13/264,806

(22) PCT Filed: May 12, 2009

(86) PCT No.: PCT/CN2009/071744
§ 371 (c)(1),
(2), (4) Date: Oct. 17, 2011

(87) PCT Pub. No.: WO2010/130083
PCT Pub. Date: Nov. 18, 2010

(65) Prior Publication Data
US 2012/0047149 A1 Feb. 23, 2012

(51) Int. Cl.
*G06F 17/30* (2006.01)
*G06F 17/27* (2006.01)

(52) U.S. Cl.
CPC ...... *G06F 17/2705* (2013.01); *G06F 17/30961* (2013.01); *G06F 17/30327* (2013.01); *G06F 17/2745* (2013.01)
USPC .......................................... 707/748; 707/749

(58) Field of Classification Search
CPC .................... G06F 17/30864; G06F 17/30867; G06F 17/30997; G06F 17/30958
USPC ................. 707/102, 749, 798, 705, 3, 5, 767
See application file for complete search history.

(56) References Cited

U.S. PATENT DOCUMENTS 6,502,105 B1 * 12/2002 Yan et al. .............................. 1/1
7,603,342 B2 * 10/2009 Gosse et al. .......................... 1/1
7,761,436 B2 * 7/2010 Norton et al. ................. 707/705

(Continued)

OTHER PUBLICATIONS

CN 1808435; Beijing Founder Electronics Co et al., Jul. 26, 2006;;ISR & WO.

(Continued)

*Primary Examiner* — James Trujillo
*Assistant Examiner* — Thong Vu
(74) *Attorney, Agent, or Firm* — Elkington & Fife; Nicholas Erte

(57) ABSTRACT

A computer-implemented method of extracting key phrases from a document is disclosed comprising the steps of accessing a repository comprising linked subjects, the repository comprising first and second data structures representing the relationship between said subjects using different representation criteria; pruning the first data structure by removing links between subjects based on a further relationship between said subjects in the second data structure; matching phrases in said document to subjects in the pruned first data structure; further pruning the pruned first data structure by removing unmatched subjects that are not linked to matched subjects; determining a ranking for each matched subject; and selecting key phrases using the determined subject rankings. A computer program for implementing the steps of this method when executed on a computer is also disclosed.

13 Claims, 4 Drawing Sheets

(56) References Cited

U.S. PATENT DOCUMENTS

Figure 1A:
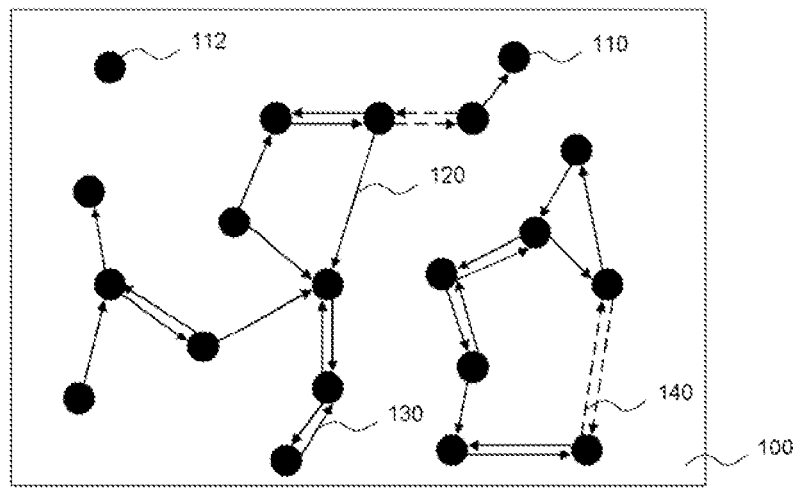

| | | | |
|---|---|---|---|
| 8,495,099 B2* | 7/2013 | Maim | 707/794 |
| 2003/0115191 A1* | 6/2003 | Copperman et al. | 707/3 |
| 2007/0220037 A1* | 9/2007 | Srivastava et al. | 707/102 |
| 2009/0292685 A1* | 11/2009 | Liu et al. | 707/5 |
| 2010/0049682 A1* | 2/2010 | Chow et al. | 706/46 |
| 2010/0274815 A1* | 10/2010 | Vanasco | 707/798 |

OTHER PUBLICATIONS

Nippon Telegraph & Telephone Corp; Sep. 17, 1996;;ISR & WO.

\* cited by examiner

DOCUMENT KEY PHRASE EXTRACTION METHOD

The present invention relates to a computer-implemented method of extracting key phrases from a document.

BACKGROUND OF THE INVENTION

Nowadays, a plethora of electronic knowledge repositories such as databases and file systems are available that can provide valuable information. Such repositories may be stored locally on a computer or maybe accessible over the Internet. Probably the best known example of such a repository is the online encyclopedia Wikipedia, and other examples will be apparent. Because the reliability of the information in such databases and in particular in Wikipedia has become very good, it has for instance been reported that Wikipedia has a comparable accuracy as the Encyclopedia Britannica, electronic databases are more and more used as instruments for processing electronic information.

In particular, electronic documents may be referenced against such an electronic database. To this end, the content of the electronic document is compared against the content of the electronic database and corresponding content can be labeled accordingly. This labeling can be used to identify key phrases in the electronic document, for instance for the purpose of providing an accurate summary of the electronic document or to prepare the electronic document for insertion into the electronic database, where the key phrases of the electronic document are converted into hyperlinks such that when added to the electronic database, users accessing the electronic document can quickly jump to the related subject.

One of the problems occurring when trying to extract key phrases from electronic document is how to distinguish between a key phrase and a phrase of lesser relevance. A common approach is to count the number of occurrences of a phrase in the electronic document to identify the more relevant phrases. Alternative approaches include the $X^2$ independence test, which assesses if the occurrence frequency of a phrase in a document is higher than would be expected from chance, as well as the keyphraseness approach, which considers whether or not a phrase is a key phrase based on the frequency of this phrase being selected as the key phrase in other database documents.

After potential key phrases have been identified, the actual key phrases are typically selected by assessing whether a subject in the electronic database corresponding to such a phrase is a subject of a particular relevance. Several algorithms exist to assess the relevance of a subject. For instance, a well-known algorithm is PageRank, the algorithm used by Google to find the most relevant pages in a user-defined query. This algorithm treats the database on which operates as a directed graph in which ranking values are assigned to the nodes of the graph using a recursive approach in which these values are calculated from the values of nodes to which they are linked.

However, the known approaches still suffer from problems. This is because the electronic databases typically contain thousands of subjects, such that many phrases in the document under consideration can be matched with a subject in the electronic database. Consequently, the known approaches have a tendency of selecting too many phrases as key phrases. Compensating for this problem by adjusting a selection threshold can cause the incorrect de-selection of key phrases.

BRIEF DESCRIPTION OF THE EMBODIMENTS

Figure 1B:
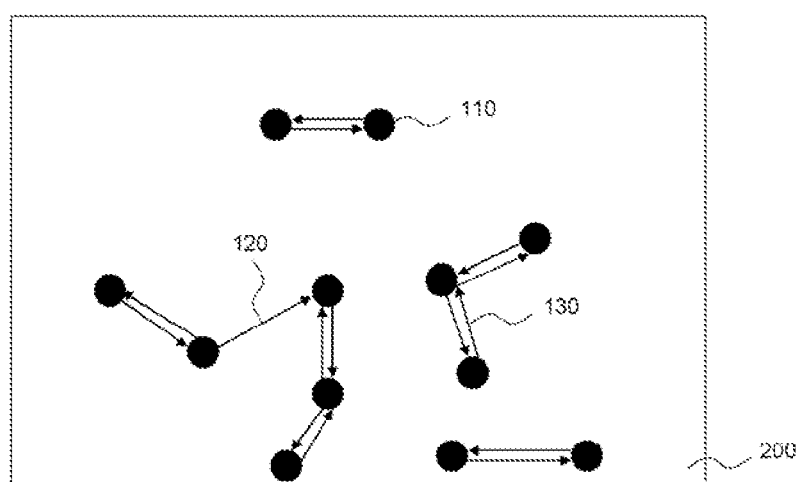
Figure 1C:
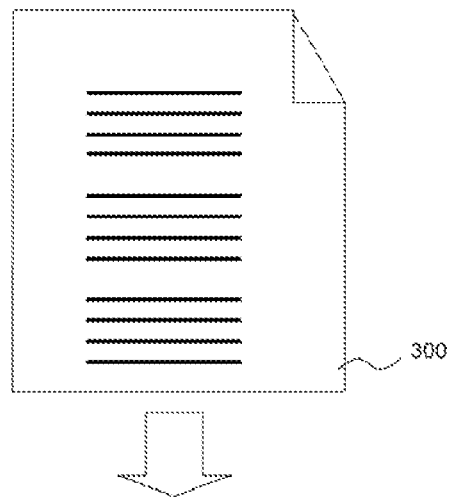
Figure 1D:
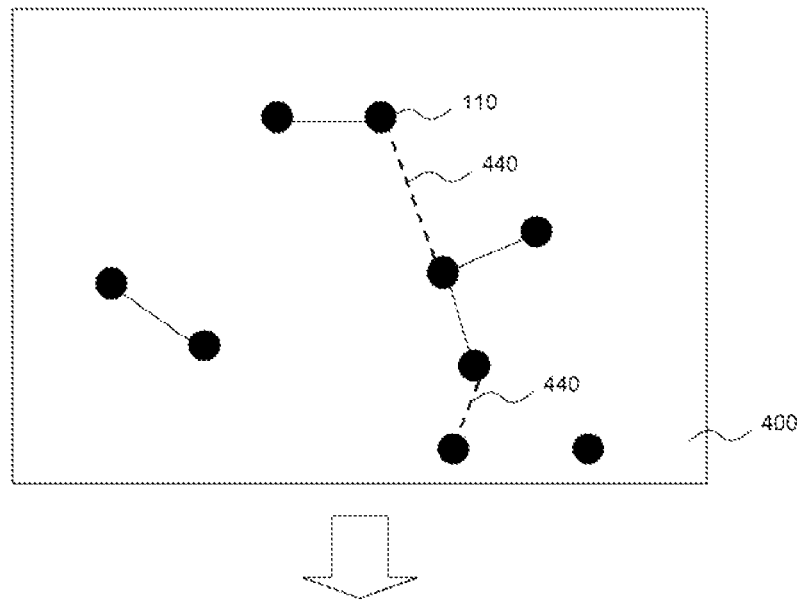
Figure 1E:
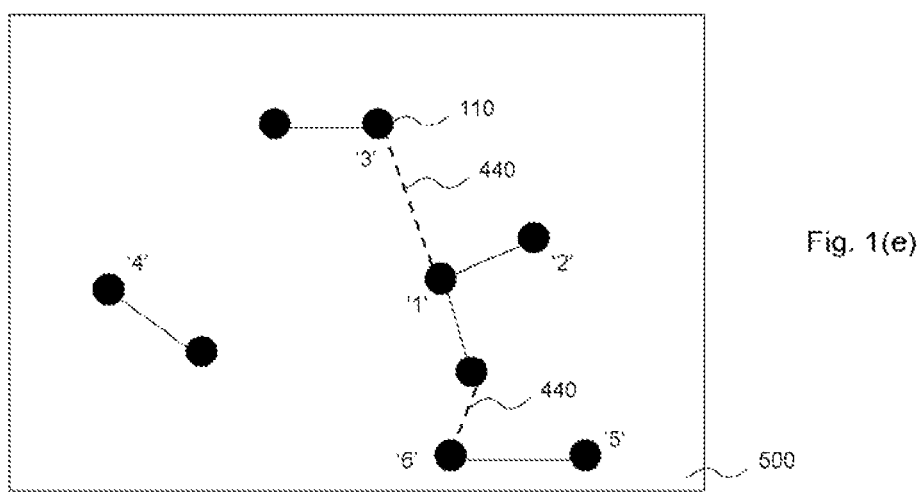
Figure 1F:
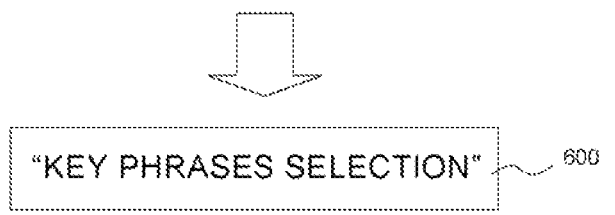
Figure 2:
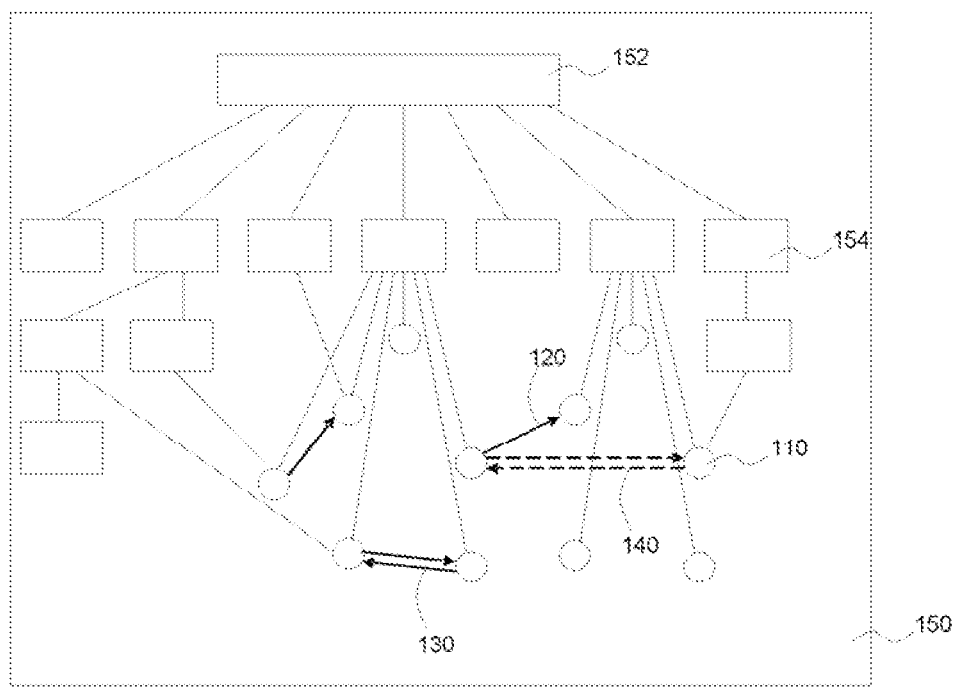

Embodiments of the invention are described in more detail and by way of non-limiting examples with reference to the accompanying drawings, wherein:

FIG. 1(a)-(f) shows various steps of an embodiment of the method of the present invention; and FIG. 2 shows a graph representation of a repository.

DETAILED DESCRIPTION OF THE DRAWINGS

It should be understood that the Figures are merely schematic and are not drawn to scale. It should also be understood that the same reference numerals are used throughout the Figures to indicate the same or similar parts.

An embodiment of a computer-implemented method of extracting key phrases from a document will be described below. The method is initiated by accessing a repository comprising linked subjects, the repository comprising first and second data structures representing the relationship between said subjects using different representation criteria. This will be explained in more detail using Wikipedia as an embodiment of such a repository, although it should be understood that this method is generally applicable to any repository in which the interrelations between repository subjects can be presented in more than one way, i.e. in which the repository comprises different types of subject organizations.

In the context of this application, a repository subject is a repository record containing information on a particular subject. The name of the record typically corresponds to the subject. The subject name may be identical to the record name, or may be related to the record name, for instance by being a synonym thereof.

In the remainder of this description, embodiments of the present invention will be described in more detail using an electronic database as a non-limiting example of such a repository. In such a database, it is usually possible to move between records using links that exist between those records. Such links may for instance be presented in the form of hyperlinks embedded in the information contained in the record. The representation of the hyperlink in the information may be identical to the name of the subject or record that the hyperlink points to, or may be related to the subject or record. For instance, in Wikipedia, the representation of a related hyperlink is sometimes referred to as surface text. This effectively means that one term is used as a hyperlink to relate to another term, for instance the term America may be used as a hyperlink text contained in the information of a record, which points to a record on the USA.

An electronic database containing such links between records or subjects can be seen as a directed graph, in which the vertices or nodes represent respective records and the edges between nodes indicate the links from one record to another. This is schematically depicted in FIG. 1(a). The directed graph 100 contained a plurality of nodes 110 that are interconnected through edges. In this record link structure in a database such as Wikipedia, two different types of links can be identified. Any link may be defined as a pointer from a source record to a destination record. An example of such a link is link 120. In the context of this application, such a link will be referred to as a mono-directional link. Several records may contain links to each other, in which case each record is a source of a link to the other record and vice versa. An example of such a link is link 130, as well as link 140. In the context of this application, such a link will be referred to as a bi-directional link. Any node in the directed graph may be directly accessed, for instance through a keyword search from the front page of the database, after which subsequent nodes may be accessed using the links provided in the source records.

Many electronic databases organise the records inside the database in more than one way. For instance, in Wikipedia, the categories described in the various Wikipedia records are also organised, or classified, under category headers. This is shown in FIG. 2, in which a category graph 150 is depicted. The category graph 150 comprises a top-level category 152 and a plurality of sub-categories 154, each of which contains a plurality of links to respective nodes 110, e.g. subjects contained in a repository such as an electronic database. Respective nodes 110 can be linked via mono-directional links 120 or bi-directional links 130 as previously explained. In an embodiment, the category graph 150 is a hierarchical structure comprising multiple levels, in which the nodes 110 may belong to more than one category.

In case of Wikipedia, such a category representation is for instance accessible through the menu at the top of the Wikipedia main page. On the English language Wikipedia main page, the categories Arts, Biography, Geography, History, Mathematics, Science, Society and Technology are given. This provides an organization structure of the categories of the records in Wikipedia that is different to the organization structure provided by the directed graph that is shown in FIG. 1(a). In this category structure, a directed link indicates that the source category is the super (or parent) category of the destination category. Any subject or record inside the database may belong to one or more categories. It is pointed out that the category representation is chosen as a non-limiting example. Any suitable alternative data structure such as for instance the concepts representation in Wikipedia may be chosen.

A problem that exists with known key phrase extraction methods is that the vast number of records that are contained within an electronic database such as Wikipedia makes it very difficult if not impossible to consistently identify key phrases in a document because many phrases in the document will be matched with one of the large number of records available in the electronic database.

This problem is addressed by pruning the first data structure, i.e. the directed graph 100, by removing links between subjects 110 based on a further relationship between said subjects in the second data structure, for example a further relationship existing between records in the category graph 150 of Wikipedia.

This will now be explained in more detail. Wikipedia provides a namespace of Wikipedia articles, each of which represents a Wikipedia subject (or concept). Assume that A= $\{a_1, \ldots, a_m\}$ is the set of all Wikipedia subjects, $R_{A \times A}$ is the set of binary relations defined on A×A. The corpus of Wikipedia articles can be viewed as a directed graph G=(A, $R_{A \times A}$), i.e. graph 100, in which the nodes 110 correspond to the Wikipedia articles, and a directed edge $(a_i, a_j) \in R_{A \times A}$, i.e. an edge 120 indicates the presence of the Wikipedia internal link from $a_i$ to $a_j$. This graph may be called the Wikipedia Hyperlink Graph.

Additionally, Wikipedia provides a Wikipedia Category Graph W=(C; $R_{C \times C}$), where C=$\{c_1, \ldots, c_n\}$ is the set of all Wikipedia categories, $(c_i, c_j) \in R_{C \times C}$ indicates that $c_j$ is the parent (or super) category of $c_i$. In this graph, each category is associated with one or more parent categories, except for the top category "Category: Contents".

In Wikipedia, each Wikipedia subject belongs to one or more categories. This subject-category mapping can be represented by a binary relation $R_{A \times C}$ defined on A×C, where $(a_i, c_j) \in R_{A \times C}$ indicates that the concept $a_i$ belongs to the category $c_j$. Hence, $R_{A \times C}$ bridges over the Wikipedia Hyperlink Graph G and Wikipedia Category Graph W.

In an embodiment, a link such as link 120 is removed if the category distance between the records or nodes 110 in the category view, e.g. the Wikipedia Category Graph W, exceeds a defined threshold. In an embodiment, this threshold is configurable. The category distance between two subjects 110 may be defined as the shortest path between the two categories of these two subjects 110 in the second data structure, where the direction of the links when computing this shortest path is ignored. This is explained in more detail below.

Suppose (a1, c1), (a2, c2)$\in R_{A \times C}$, the category distance between $a_1$ and $a_2$ through $c_1$ and $c_2$, denoted by $d_{(c1,c2)}(a_1, a_2)$, is the shortest path between $c_1$ and $c_2$ on the Wikipedia Category Graph G. It should be noted that the direction of the edges in the Wikipedia Category graph is ignored when computing this shortest path. Additionally, a concept may belong to multiple categories. Suppose $a_1$ belongs to $\{c_{11}, \ldots, c_{1n1}\}$ and $a_2$ belongs to $\{c_{21}, c_{2n2}\}$, then the category distance between $a_1$ and $a_2$ is $$d(a_1, a_2) = \min_{i,j} d(c_{1i}, c_{2i})(a_1, a_2).$$

In the Wikipedia Category Graph, the semantics represented by a category is closely related to that represented by its parent category. Thus, the shorter the category distance between two Wikipedia subjects is, the more these two subjects are semantically related. Additionally, if there exists a bi-directional link between two Wikipedia concepts in the Wikipedia Hyperlink Graph, these two concepts are more likely to exhibit a semantic relationship. Therefore, the following two simple heuristics are used to identify the semantically associative links in the Wikipedia Hyperlink Graph.

Given a specified parameter $r \in N_+$, with $N_+$ denoting the set of positive natural numbers, any link $(a_i, a_j) \in R_{A \times A}$, such that $d(a_i, a_j)$ r, is a semantically associative link, i.e. a link indicating a close relationship between the linked subjects.

In an embodiment, if there exists a bi-directional link between two Wikipedia concepts in $R_{A \times A}$, the links between these two concepts are also considered semantically associative. This way, bidirectional links, which were removed in the aforementioned pruning step because the distance d between the linked subjects in the category view exceeded the defined threshold may be reinstated in the pruned graph.

The remaining links that do not satisfy the above two rules are considered to be navigational links, i.e. links that do not represent a close relationship between the linked subjects. The pruned graph that results from removing the navigational links from the Wikipedia Hyperlink Graph is the basic link structure for running the ranking algorithm.

Hence, as will be apparent from the above example, in case it is determined that the category distance between a pair of linked nodes 110 falls within the defined threshold, it can be assumed that the information, i.e. subject, contained in these nodes or records is strongly related to each other. Thus, the pruning of the directed graph 100 using the aforementioned pruning metric ensures that a directed graph is obtained in which nodes 110 are only linked to each other if it has been established by evaluation of the further relationship between the nodes that the nodes describe closely related subject matter. Note that are no longer connected to other nodes are removed from the graph. It should however be understood that the distance metric applied on the category representation of the graph subjects may be applied on any suitable alternative representation of the graph subjects.

In an embodiment, the pruning metric based on the category distance threshold determination and the further metric based on the determination of the presence of a bidirectional edge 130 may be combined. It has been found that the combination of these two metrics leads to an accurate determination of closely related subjects or records 110 in the electronic database represented by directional graph 100. The combined application of these pruning and addition metrics may for instance lead to the deletion of edges 120 from the directed graph 100 because of these edges are not bidirectional, as well as the bidirectional edge 140 for which the category distance between the subjects or nodes 110 exceeds the defined threshold and to the subsequent reinstatement of bidirectional edge 140. In the directed graph 100 as well as in the category graph 150, the nodes between which bidirectional edges 140 exist that exceed the defined threshold are indicated by dashed lines. In an embodiment, following the removal of selected pictures from the directed graph 100, unconnected nodes such as node 112 may also be removed from the directed graph 100. This pruning exercise yields a pruned graph 200 that only contains nodes 110 that are connected to other nodes through edges 130. As previously explained, the pruned graph 200 may comprise mono-directional edges 120 between nodes having a short category distance as well as bidirectional edges 130 that include bidirectional edges between nodes having a category distance exceeding the defined threshold.

For example, application of the aforementioned pruning metric on the directed graph 100 may lead to the resulting graph 200 shown in FIG. 1(b). Such a graph can be seen as a conceptually related graph since it only contains links between subjects that are semantically related. The graph 200 is treated as an undirected graph.

Next, the document 300, schematically depicted in FIG. 1(c), from which the key phrases are to be extracted, is projected onto the undirected graph 200. In this projection step, phrases in the document are attempted to be matched with the subjects captured in the nodes 110. Any suitable matching technique including disambiguation techniques may be used. For the sake of completeness, it is explained that a disambiguation technique is a technique in which for a phrase having multiple meanings, i.e. for which multiple nodes 110 exist in the electronic database, the correct meaning is extracted from the context in which the phrase is used in the document. Disambiguation techniques are known per se and are not further explained for the sake of brevity only.

The undirected graph 200 may be further pruned by only keeping those nodes and connecting edges that are matched to a phrase in the document 300. In an embodiment, a node 110 is kept in the graph if it is matched to a phrase in the document 300 or if it is directly linked to a node that is matched to a phrase in the electronic document 300. This yields the further pruned graph 400 shown in FIG. 1(d). Other selection metrics will be apparent to the skilled person.

It is possible that two phrases that are matched to corresponding records in the electronic database are contextually related despite the fact that the further pruned graph 400 does not contain a link or edge between the nodes 110 matched to those phrases. This for instance may be the case if the phrases appear within a certain distance of each other in the document 300. In an embodiment, it is checked whether an edge its present between two nodes 110 there are matched to phrases residing in the document 300 within a defined distance, for instance within five words from each other. If such an edge is not present, it may be added to the further pruned graph 400, such as the edges 440. This further increases the amount of contextual relationships between subjects captured by the document contextual relationship graph 400.

It will be appreciated that the defined distance between the phrases in the electronic document 300 may be configurable. This has the advantage that for different types of documents in which phrases because of a difference in the writing style of the author, the distance between correlated phrases may vary.

In an embodiment, a recursive algorithm is used to find the optimum value of this distance by evaluating the size of the document and the number of correlated phrases found in the document and adjusting the distance metric to ensure the ratio between the size of the document and a number of correlated phrases fall within a defined range.

The undirected graph 400 may be seen as a document concept graph in which all concepts or phrases that could be mapped onto the database subject relationship graph 200 and their inter-relationships are captured. This graph 400 can be used to accurately determine which of the mapped phrases in the document 300 should be identified as key phrases. This may for instance be achieved by assigning a ranking score to the nodes 110 of the further pruned undirected graph 400. Any suitable ranking algorithm such as an algorithm based on the PageRank algorithm may be used for this purpose. It should however be appreciated that the PageRank algorithm was designed to operate on a directed graph, whereas in the context of the present application, this algorithm operates on the undirected graph 400.

In an embodiment, the ranking algorithm is further refined by assigning initial scores to nodes 110 based on the number of times these nodes occur in the document 300. In other words, the occurrence frequency of the phrases is determined. This has the advantage that nodes 110 that are matched to phrases having a low occurrence frequency are immediately penalized in the ranking algorithm such that it becomes less likely that nodes 110 that would receive a high ranking based on their relevance in the graph 400 end up with a high final ranking score due to the fact the initial value assigned to such nodes prevents a significant weight being assigned to such nodes in the iteration steps of such algorithms.

In a further embodiment, the initial ranking assigned to a node 110 is based on a combination of the occurrence frequency in the electronic document 300 of the phrase linked to this node 110 and the number of edges connected to this node 110. This further penalizes isolated nodes in the graph 400 such that the subjects in this graph that appeared to have little correlation with other nodes are assigned a lower weight than those nodes that are heavily linked to other nodes.

During the ranking iterations, the score assigned to each node may be adjusted by absorbing a fraction of all the whole score of nearest neighbour nodes in the undirected graph 400. The iterative procedure is typically terminated when between successive iteration steps the change in ranking scores falls below a defined threshold. Again, such a threshold may be configurable.

A non-limiting example of a suitable ranking algorithm is given below. Let $v^t_i$ be the saliency score of the Wikipedia subject $a_d^i$ after t rounds of iteration. In each iteration, each Wikipedia subject absorbs a fraction of the saliency scores from its neighbours in $G'_d$, and retains some information in its initial support value. The saliency score of $a_d^i$ after t+1 iterations is $$v_i^{t+1} = (1-\alpha) \sum_{j: a_{jd} \in N(a_d^i)} \frac{v_j^t}{|N(a_d^j)|} + \alpha v_i^0$$

where $N(a_d^i)$ is the adjacent node set of $a_d^i$, $v_i^0$ is the initial saliency score of $a_d^i$ which will be explained in more detail below, and $0<\alpha<1$ is the fraction of the original support value that $a_d^i$ keeps. The value of $\alpha$ may be chosen to have any suitable value. In an embodiment, $\alpha$ is chosen to be 0.618.

The final saliency score of $a_d^i$ is denoted as $v(a_d^i)$. Different from PageRank, this algorithm runs on an undirected graph.

In an embodiment, the initial saliency score of each subject is set to its support value multiplied by the degree of the node. That is, $v_i^0 = \text{freq}(a_d^i) \times |N(a_d^i)|$, in which $\text{freq}(a_d^i)$ is the frequency at which subject $a_d^i$ occurs in the document. This initialization method is designed to further penalize the nodes with low degrees, especially isolated nodes when present.

Upon establishing the final ranking values of the nodes 110 in the undirected graph 400, a ranked graph 500 is obtained as shown in FIG. 1(e). It should be appreciated that the values assigned to the nodes in the ranked graph 500 are not the absolute values but demonstrate the relevance order of the nodes with the lowest number being the node having the highest relevance. It is not necessary to establish such a relevance order. Instead, the most relevant nodes may simply be identified by finding the highest ranking score in the ranked graph 500.

The key phrases of the document 300 may now simply be determined by identifying the nodes 110 that have the highest rankings and identifying the phrases in the document 300 that correspond to the identified nodes, as schematically depicted by the step in FIG. 1(f). The number of phrases that are selected in this way may be defined in any suitable manner. For instance, a ranking threshold may be applied to only select nodes 110 that have a minimum ranking value or key phrases are selected from the node with the highest rank score downwards until a defined number of phrases have been identified. The selection criteria for selecting the number of key phrases may be configurable.

The identified key phrases may be used as key words to describe or summarize the electronic document 300. Alternatively, the identified key phrases in the electronic document 300 may be converted into hyperlinks to the matched nodes 110 such that the electronic document 300 may be added as a node 110 to the electronic database.

In an embodiment, the aforementioned method of identifying key phrases in electronic document may be repeated for a further document. It will be appreciated that it is not necessary to repeat all the steps that have been described above. For instance, the steps of extracting the directed graph 100 and the pruning of this graph to yield the pruned graph 200 may be omitted if the pruned graph 200 is stored in an accessible manner. In an embodiment, the steps of extracting the directed graph 100 and the pruning of this graph to yield the pruned graph 200 may be periodically repeated to ensure that additions to the electronic database, i.e. records added to the database after the latest version of the pruned graph 200 has been constructed are added to the pruned graph 200.

In an embodiment, the aforementioned method is made available as a computer program stored on a suitable computer readable data storage device such as a CD-ROM, DVD, Internet-accessible server, and so on. The algorithms required for implementing the various steps of the method to extract key phrases from a document 300 are well-known to the skilled person and are not further discussed for reasons of brevity only. Such a computer program when executed on a computer implements the steps of this method.

At least some of the main advantages of at least one embodiment of the method of the present invention are summarized below.

The Document Concept Graph model used for ranking key concepts is constructed by leveraging not only the co-occurrence relation within the local context of a document but also the pre-processed hyperlink-structure of an electronic database such as Wikipedia. This ensures the determination of more comprehensive semantically associative relationships among key subjects, such that salient phrases related to the theme of the electronic document 300 can be extracted more effectively.

The Concept Relation Graph 200 is constructed by distinguishing semantically associative links from navigational links, i.e. linking steps for which the correlation between the subjects of the linked nodes 110 is less than a defined threshold, for example by using the Wikipedia Hyperlink Graph 100 and the Wikipedia Category Graph, such that the ranking performance of the ranking algorithm applied to the document concept graph 400 can be improved significantly.

In the concept ranking algorithm, initialisation of the weight of each node 110, e.g. each Wikipedia concept by considering both the frequency of each Wikipedia concept in the document and its link structure in the corresponding Document Concept Graph further improves the consistency of the determination of key phrases in the electronic document 300. This initialization method is designed to further penalize the nodes 110 that are linked to phrases in the document 300 having a relatively low occurrence frequency in this document, such that the ranking results can be more reasonable.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method of extracting key phrases from a document comprising:
   accessing a repository comprising hyperlinked subjects, the repository comprising first and second data structures representing the relationship between said hyperlinked subjects using different representation criteria;
   pruning the first data structure by removing hyperlinks between subjects based on a further relationship between said subjects in the second data structure;
   matching phrases in said document to said subjects in the pruned first data structure;
   further pruning the pruned first data structure by removing unmatched subjects that are not hyperlinked to matched subjects;
   determining a ranking for each matched subject; and
   selecting key phrases using the determined subject rankings, wherein the first data structure is a directional graph comprising the subjects as nodes and the hyperlinks between subjects as edges between nodes; the second data structure is a directional graph comprising organized subject categories; and the further relationship comprises the shortest distance between respective categories to which respective subjects belong in the second data structure, the hyperlink between said subjects being removed if the shortest distance exceeds a threshold value.

2. The method of claim 1, wherein the threshold value is configurable.

3. The method of claim 2, further comprising restoring a hyperlink between subjects in said pruned first data structure if a bidirectional hyperlink exists between the subjects in said repository.

4. The method of claim 1, wherein the phrase matching step includes a disambiguation evaluation step.

5. The method of claim 1, further comprising adding a bi-directional hyperlink between matched subjects prior to said further pruning step, wherein said bi-directional hyperlink is added if the phrases matched to said subjects occur in the document within a defined distance from each other.

6. The method of claim 5, wherein the defined distance is configurable.

7. The method of claim 1, wherein the matched subject ranking step utilizes an algorithm considering the number of hyperlinks to a subject and the ranking of the subjects from which said hyperlinks originate.

8. The method of claim 1, wherein the subject ranking, step further comprises determining an initial ranking based on the number of occurrences of the corresponding phrase in the document.

9. The method of claim 1, wherein the repository is an Internet-accessible database.

10. The hod of claim 9, wherein the database is Wikipedia.

11. The method of claim 1, further comprising extracting key phrases from a further document by repeating the phrase matching, further pruning, subject ranking, and key phrase selection steps for the further document.

12. The method of claim 1, further comprising inserting the hyperlinks to the respective subjects corresponding to the selected key phrases into the document.

13. A non-transitory computer-readable data storage device comprising instructions which cause the computer program to:
   access a repository corn rising hyperlinked subjects, the repository comprising first and second data structures representing the relationship between said hyperlinked subjects using different representation criteria;
   prune the first data structure by removing hyperlinks between subjects based on a further relationship between said subjects in the second data structure;
   match phrases in said document to said subjects in the pruned first data structure;
   further prune the pruned first data structure by removing unmatched subjects that are not determine a ranking for each matched subject; and
   select key phrases using the determined subject rankings, wherein the first data structure is a directional graph comprising the subjects as nodes and the hyperlinks between subjects as edges between nodes; the second data structure is a directional graph comprising organized subject categories; and the further relationship comprises the shortest distance between respective categories to which respective subjects belong in the second data structure, the hyperlink between said subjects being removed if the shortest distance exceeds a threshold value.

* * * * *